United States Patent [19]

Carroll

[11] Patent Number: 4,791,546
[45] Date of Patent: Dec. 13, 1988

[54] VOLTAGE REGULATOR CIRCUIT

[75] Inventor: David T. Carroll, Sonoma, Calif.

[73] Assignee: DCI Technology, Sonoma, Calif.

[21] Appl. No.: 137,787

[22] Filed: Dec. 23, 1987

[51] Int. Cl.[4] .............................................. H02M 3/24
[52] U.S. Cl. ........................................ 363/95; 363/21; 363/97
[58] Field of Search ...................... 363/21, 26, 41, 95, 363/97, 134

[56] References Cited

U.S. PATENT DOCUMENTS

4,315,303 2/1982 Snyder .................................. 363/21
4,318,168 3/1982 Faxon .................................... 363/21
4,561,047 12/1985 Depuy .................................... 363/21

Primary Examiner—Patrick R. Salce
Assistant Examiner—Jeffrey Sterrett
Attorney, Agent, or Firm—Brian D. Ogonowsky; Alan H. MacPherson; Paul J. Winters

[57] ABSTRACT

An inventive voltage regulator is herein described to provide voltage regulation while maintaining electrical isolation between the input and output sections of a power supply. In a switching regulator for a power supply, a core of the sense transformer is charged until the sense transformer becomes saturated. The charging power is then removed from, for example, the primary winding, and the voltages across the primary and secondary windings reverse polarity and begin to rise. The voltage across the primary winding rises until it forward biases a low power diode connected between a non-grounded output terminal of the power supply, at an output voltage of $V_{out}$, and the primary winding of the sense transformer. Thus, the voltage across the primary winding is clamped to the output voltage plus a diode voltage drop. As the energy in the sense transformer dissipates into an output load connected to the output terminals of the power supply, a voltage corresponding to $V_{out}$ is generated across the secondary winding of the sense transformer. This voltage is applied to a peak detector and the output of the detector applied to a controlling means which compares the voltage to a reference voltage and adjusts the power supply output voltage accordingly.

9 Claims, 5 Drawing Sheets

VOLTAGE REGULATOR CIRCUIT

BACKGROUND OF THE INVENTION

1. Field of the Invention

This invention relates to voltage regulators, and in particular to an improved voltage regulator of the type which provides isolation between an input circuit and an output circuit.

2. Description of Prior Art

Figure 1A:
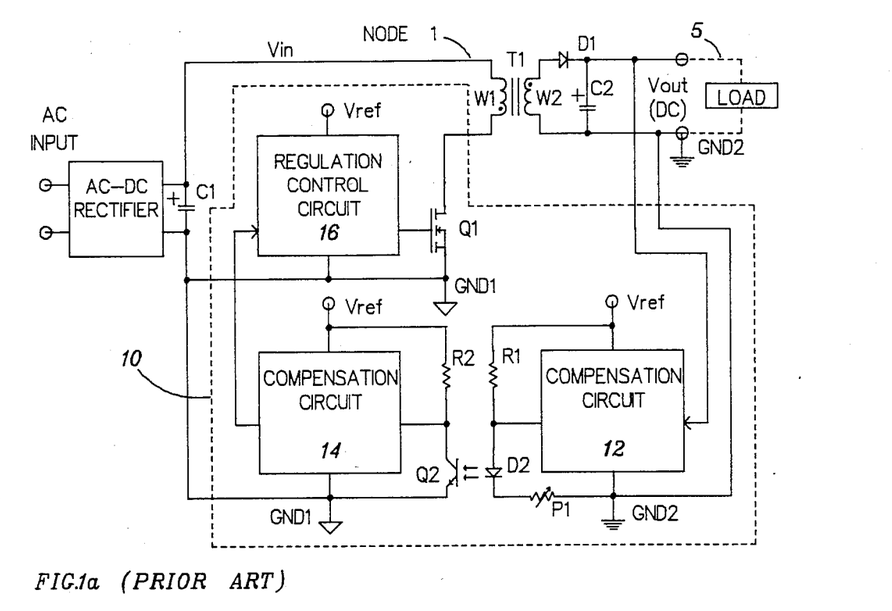
FIG. 1a is a schematic diagram of a representative prior art DC switching power supply and regulator circuit which uses optical coupling to isolate the power supply input from its output.

My invention, which will be later described, may be employed in a variety of types of voltage regulators. A representative prior art switching type regulator, which serves to describe a common drawback in voltage regulators of the type required to provide isolation between an input circuit and an output circuit, is shown in FIG. 1a. FIG. 1a shows AC to DC power supply circuit 5, which includes switching regulator circuit 10. Switching regulator circuit 10 provides voltage regulation of DC output voltage $V_{out}$ while maintaining electrical isolation between the output side and input side of power supply circuit 5. Total electrical isolation between the input and the output is necessary in many high voltage applications for safety reasons to ensure the ground potential at the output is not affected by changes in ground potential at the input. Switching regulator circuit 10 compensates primarily for a change in power supply output load. It does this by monitoring the power supply output voltage $V_{out}$. The output voltage on secondary winding W2 of power transformer T1 can be seen reflected on primary winding W1 where it could just as easily be detected and used as a correction signal, however, since there are losses in power transformer T1 and large losses in output rectifier diode D1, it is desireable to monitor the voltage after these loss elements. At 5 volts output, for example, the voltage loss across diode D1 can vary between approximately 0.3 volts to 1.5 volts depending on the current supplied to the output load.

Figure 1B:
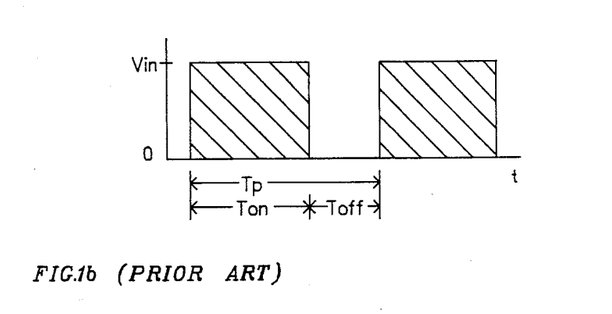
FIG. 1b illustrates a quasi-squarewave voltage.

In power supply circuit 5, transistor Q1, in series with primary winding W1 of power transformer T1, acts as a switch, rapidly turning on and off and pulsing DC input voltage $V_{in}$ through primary winding W1. The switching frequency of transistor Q1 commonly exceeds 20 KHz. Transistor Q1 provides the necessary duty cycle (i.e., time on/time off) of $V_{in}$ to achieve a desired output voltage $V_{out}$, wherein an increased duty cycle results in an increased $V_{out}$. FIG. 1b shows the resulting quasisquarewave voltage across winding W1 of power transformer T1 with a peak amplitude of $V_{in}$, a period of $T_p$, and a duty cycle of $T_{on}/T_{off}$.

In power supply circuit 5, when transistor Q1 is on, winding W1, having an inductance L, is charged by the current through the winding, resulting in energy J being stored in the core of power transformer T1, wherein:
ti $J = L \cdot I^2 / 2$ where
  J=energy in joules,
  L=inductance in henries of winding W1, and
  I=current in amperes through winding W1.

As seen by the opposite dot-indicated polarities of primary winding W1 and secondary winding W2, when transistor Q1 is on and a current flows through winding W1 from the top end of winding W1 to GND1, current flow in winding W2 is from the top end of winding W2 to GND2. And, since the resulting voltage at the anode of output rectifier diode D1, diode D1 being in series with winding W2, is more negative than the voltage, $V_{out}$, at its cathode, due to output filtering capacitor C2 being charged to $V_{out}$, diode D1 is reverse biased. Thus, energy cannot be transfered through power transformer T1 to the output load connected across filtering capacitor C2. During the time that power transformer T1 is storing energy, filtering capacitor C2, having been previously charged to $V_{out}$, as will be described below, supplies the necessary output voltage $V_{out}$ and current to the output load.

When transistor Q1 is switched off, the voltages across windings W1 and W2 of power transformer T1 reverse polarities due to the magnetic field in the core of transformer T1 trying to collapse. These voltages across windings W1 and W2 rise ntil the voltage across winding W2 forward biases output rectifier diode D1 at a voltage of $V_{out} + V_{D1}$, where $V_{D1}$ is the voltage drop across diode D1. The energy stored in power transformer T1 now dissipates into the output load and into capacitor C2 at a voltage, as measured across capacitor C2, equal to $V_{out}$ and at a current determined by that required to power the output load and to recharge capacitor C2.

Switching regulator circuit 10 uses light emitting diode D2 and phototransistor Q2 to provide isolation between the input and output sections of power supply circuit 5. Switching regulator circuit 10 requires compensation circuits 12 and 14 to compensate for the nonlinearity of the light output of diode D2 with changes in temperature and excitation current, and the nonlinearity of the conductance of phototransistor Q2 with changes in temperature and light input. Potentiometer P1 enables adjustment of the light output of diode D2 for a given $V_{out}$. The proper bias current through diode D2 is set by reference voltage $V_{ref}$ being applied across potentiometer P1, diode D2, and resistor R1, in series.

Assuming $V_{out}$ rises above an acceptable level, an increased current, compensated by compensation circuit 12, will be drawn through diode D2, increasing its light output. Phototransistor Q2, detecting an increased light input, conducts more current, thus increasing the voltage drop across collector resistor R2, and hence, lowering the input voltage into compensation circuit 14. Compensation circuit 14 provides a corresponding lower voltage into regulator control circuit 16, which, if regulator control circuit 16 is a pulsewidth modulator, provides a quasisquarewave input voltage, corresponding to the duty cycle of voltage $V_{in}$ needed to produce the desired $V_{out}$, into the control terminal of switching transistor Q1. Thus, as seen, power supply circuit 5 provides a relatively constant $V_{out}$ while maintaining electrical isolation between the output and input sections of power supply circuit 5 via the optical coupling. A schematic diagram of an actual regulated power supply using opto-isolation is shown in the book, "Power MOSFET Transistor Data", by Motorola, Inc., FIGS. 7-3 and 7-4, page A-74, 1984, and is herein incorporated by reference.

This method of providing isolation is common and works well. The drawbacks are mostly cost and complexity, partially due to the cost of the opto-isolator and partially due to the compensation circuits necessary to compensate for the nonlinearity of diode D2 and transistor Q2. Also, since most opto-isolators have a broad manufacturing tolerance, a variable potentiometer is commonly installed, which must be adjusted in the production stage. This adds parts and labor costs and decreases reliability, since unsealed variable potentiometers lend themselves to failure as a result of vibration or environmental conditions.

SUMMARY

An inventive voltage regulator is herein described to provide voltage regulation while maintaining electrical isolation between the input and output sections of a power supply. Rather than using optical coupling to provide electrical isolation, this inventive voltage regulator uses a transformer in a novel sensing circuit, the sense circuit providing an electrically isolated control voltage, corresponding to the output voltage of a power supply, to a controlling means for adjusting the power supply output voltage. When using this sensing circuit to measure output voltage, there is no linearity problem, nor are there any temperature sensitivity problems. Since current through the sensing circuit is held relatively constant, any small errors, such as voltage drops across diodes, can be calculated and factored out.

In the case where my sensing circuit is employed in a switching regulator, the sensing circuit consists of a sense transformer with a primary winding, associated with the output side of a power supply, and a secondary winding, associated with the input side of the power supply, wherein the core of the sense transformer is charged, by either an external voltage source or by the power supply voltage across the primary or secondary windings, until the transformer becomes saturated. The charging power is then removed from, for example, the primary winding, and the voltages across the primary and secondary windings reverse polarity and begin to rise. The voltage across the primary winding rises until it forward biases a low power diode connected between the non-grounded output terminal of the power supply, which is at an output voltage of $V_{out}$, and the primary winding, of the sense transformer. The voltage across the primary winding is, therefore, clamped to approximately $V_{out}+0.7$ volts, where the 0.7 volts is the low current voltage drop across the low power diode. Energy stored in the sense transformer then begins to dissipate through the output load at a voltage $V_{out}+0.7$ volts. This dissipation of the energy stored in the sense transformer causes a change in flux in the core of the sense transformer corresponding to that required to generate the clamped voltage. This change in flux induces a voltage across the secondary winding of the sense transformer equal to $(V_{out}+0.7 \text{ volts}) (N2/N1)$, where N1 and N2 are the number of turns of the primary and secondary windings, respectively. Since the current through the primary winding of the sense transformer is relatively small and constant, due to the current through the inductive primary winding being unable to change instantaneously and the energy stored in the transformer being relatively low, the current through the diode coupled between $V_{out}$ and the primary winding of the sense transformer is held relatively constant, thus producing a predictable voltage drop across the diode which can easily be compensated for and factored out. The resulting DC voltage across the secondary winding of the sense transformer is then applied to a peak detector/rectifier circuit and to a pulse width modulator circuit. The pulse width modulator circuit references the voltage across the peak detector (a capacitor) to a fixed reference voltage and generates an appropriate quasi-squarewave voltage, which is applied to the control terminal of a switching transistor to adjust the duty cycle of the power supply input voltage.

This concept of using a saturated sense transformer to generate a voltage corresponding to the actual output voltage of a power supply may be applied to various other power supplies such as a linear type, where error correction is obtained by controlling the resistance of an element in series with a power supply output terminal, or an AC to AC line frequency type.

BRIEF DESCRIPTION OF THE DRAWINGS

FIG. 2b illustrates various voltage and current levels across the transformer windings in FIG. 2a.

DETAILED DESCRIPTION

Figure 2A:
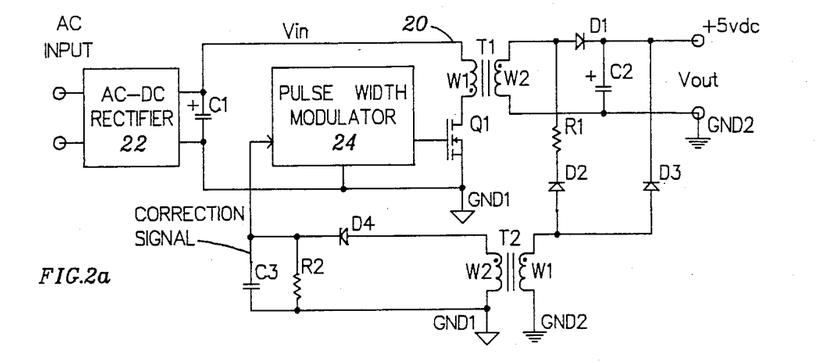
FIG. 2a is a schematic diagram of an inventive DC switching power supply and regulator circuit which employs my inventive sense transformer.
Figure 2B:
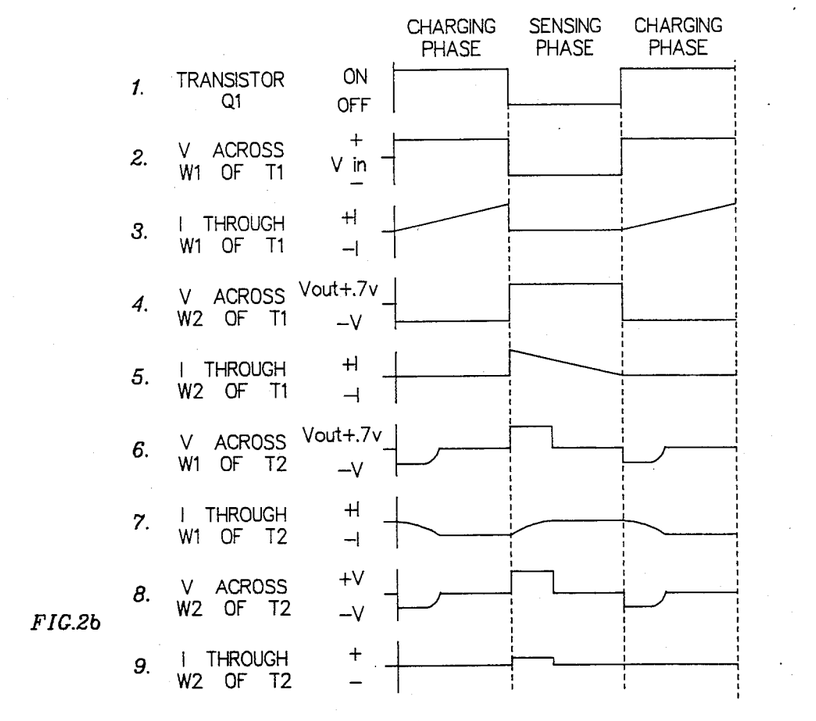

FIG. 2a illustrates the preferred embodiment of the invention when incorporated in a DC switching power supply. The invention, however, may be utilized in various types of power supply circuits and have many configurations as illustrated in FIGS. 3-8. In FIG. 2a, power supply 20 includes power transformer T1, wherein AC to DC rectifier 22, in conjunction with filtering capacitor C1, provides excitation voltage to primary winding W1 of power transformer T1. The excitation voltage across winding W1 is switched rapidly on and off by transistor Q1 which is, in this embodiment, an enhancement type N-channel MOSFET in series with winding W1, to produce a quasi-squarewave voltage of peak amplitude $V_{in}$, as shown in FIG. 2b, graphs 1 and 2. The duty cycle (i.e., time on/time off) oi the quasi-squarewave voltage determines the output voltage $V_{out}$ of power supply 20, with an increased duty cycle generating an increased $V_{out}$. When transistor Q1 is switched on, and $V_{in}$ is applied across primary winding W1 of power transformer T1, a changing current di/dt, as shown in FIG. 2b, graph 3, flows through winding W1 related to $V_{in}/L$, where L is the inductance of winding W1. This changing current through winding W1 generates a changing flux through the core of power transformer T1 which, in turn, generates a voltage across secondary winding W2 of power transformer T1, as shown in FIG. 2b, graph 4, which has a polarity opposite that of $V_{in}$, as indicated by the position of the dots on the windings of power transformer T1. Thus, when $V_{in}$ is across winding W1, the voltage at the top of winding W2 in power transformer T1 will be negative with respect to ground GND2. This negative voltage reverse biases rectifying diode D1, in series with winding W2, and forward biases diode D2, diode D2 being coupled to winding W2, through resistor Rl, and to winding W1 of sense transformer T2. The resulting current through resistor Rl, diode D2, and winding W1 of sense transformer T2, shown in FIG. 2b, graph 7, produces a voltage across winding W1 of sense transformer T2, shown in FIG. 2b, graph 6, the voltage across winding W1 depending on the impedance of winding W2 of power transformer T1, the resistance of resistor R1, the impedance of winding W1 of sense transformer T2, and the voltage drop across diode D2. Diode D3, whose anode is connected to winding W1 of sense transformer T2 and whose cathode is connected to the non-grounded power supply output terminal, is reverse biased since the voltage at the top of winding W1 of sense transformer T2 is negative with respect to the voltage $V_{out}$ at the power supply output terminal. Transformer T2, therefore, is now being energized by the voltage across winding W1 of sense transformer T2. Energy is unable to dissipate through winding W2 of sense transformer T2, since diode D4, connected in series with winding W2, is reverse biased. This is shown in FIG. 2b, graph 9, by a zero current through winding W2 when transistor Q1 is on. The number of turns of winding W1 of sense transformer T2, wire size, permeability, core geometry and core material of sense transformer T2 are so chosen that before the end of the charging phase, sense transformer T2 will saturate, resulting in no further change of flux in the core of sense transformer T2. After saturation there is no appreciable voltage across winding W1 of sense transformer T2, since winding W1 of sense transformer T2 now becomes purely resistive. Shown in FIG. 2b, graph 8, is the voltage across winding W1 of sense transformer T2, wherein at saturation the voltage across winding W1 becomes zero. The constant voltage across winding W2 of power transformer T1 now results in a constant current through winding W1 of sense transformer T2, the current primarily determined by the value of resistor R1 and the voltage across winding W2 of power transformer T1. Since the inductance of winding W1 of sense transformer T2 is fixed and the current through winding W1 of sense transformer T2 is constant, the energy stored in sense transformer T2 may be defined by the following equation:

$$J = L \cdot I^2/2,$$

where
 J = energy in joules,
 L = inductance in henries of winding W1, and
 I = current in amperes through winding W1.

When switching transistor Q1 is switched off, the voltage polarity at the top of secondary winding W2 of power transformer T1 will reverse and be at a positive voltage with respect to ground GND2 due to the flux field stored in power transformer T1 trying to collapse by generating a voltage on winding W2 of power transformer T1 of a polarity opposite that of the polarity of voltage which gave rise to the storage of energy. The voltage across winding W2 of power transformer T1 now forward biases output rectifier diode D1 and is clamped at a voltage $V_{out}+V_{D1}$ volts, where $V_{D1}$ is the voltage age drop across diode D1, and wherein $V_{D1}$ increases with increasing current through diode D1. The voltage and current generated by winding W2 of power transformer T1, shown in FIG. 2b, graphs 4 and 5, now supplies the necessary current to the output load at a voltage $V_{out}$ and recharges filtering capacitor C2.

Diode D2, connected between winding W2 of power transformer T1 and winding W1 of sense transformer T2, is no longer forward biased due to the voltage at its cathode now being positive with respect to ground GND2, and, thus, no current flows through resistor R1. Since the current into winding W1 of sense transistor T2 has now ceased, the voltage across winding W1 of sense transformer T2 also reverses its polarity while the flux field in the core of sense transformer T2 tries to collapse. This voltage rises until it forward biases diode D3, whose anode is connected to winding W1 of sense transformer T2 and whose cathode is coupled to $V_{out}$. Since the voltage at the cathode of diode D3 is $V_{out}$, the voltage across winding W1 of sense transformer T2 is clamped to $V_{out}+0.7$ volts, where the 0.7 volts is the low current voltage drop across diode D3. The stored energy in sense transformer T2 now dissipates into the output load. The current through winding W1 of sense transformer T2, at a voltage of $V_{out}+0.7$ volts across the winding, generates a change in flux in the core of sense transformer T2 such that the voltage across winding W2 of sense transformer T2 equals $V_{W2} = V_{W1} (N2/N1)$, where $V_{W2}$ equals the voltage across winding W2 of sense transformer T2, $V_{W1}$ is the voltage across winding W1 of sense transformer T2, and N1 and N2 equal the number of turns of windings W1 and W2 of sense transformer T2, respectively. Voltage $V_{W2}$ across winding W2 of sense transformer T2 now forward biases diode D4, connected between winding W2 of sense transformer T2 and peak detector capacitor C3, if voltage $V_{W2}$ is 0.7 volts higher than the voltage across capacitor C3, which was charged to a voltage of approximately $V_{W2}-0.7$ volts on a previous cycle. Thus, if voltage $V_{W2}$ rises from the previous cycle, the voltage across capacitor C3 will also rise. Resistor R2, in parallel with capacitor C3, acts to dissipate the charge in capacitor C3, ensuring capacitor C3 closely reflects the average voltage over one or more cycles. The value of resistor R2 must be chosen so that the majority of current flows through diode D3 rather than diode D4 to ensure that there is adequate voltage to forward bias diode D3. The voltage across capacitor C3 is now applied to pulse width modulator 24, which compares the voltage to a reference voltage. Output voltage $V_{out}$ is then adjusted accordingly by pulse width modulator 24 adjusting the duty cycle of $V_{in}$ through winding W1 of power transformer T1. Since currents through diodes D3 and D4 are made small by the design of sense transformer T2 and the value of resistor R2, the voltage drops across these diodes are essentially constant with little variation in changes of output load and, therefore, may be easily factored out.

As seen, the concept behind using a saturated transformer to generate a voltage linearly corresponding to the output voltage of a power supply can be employed in a variety of types of power supplies to provide error correction and isolation. Key inventive concepts in the present invention include saturating a sense transformer and allowing the sense transformer to dissipate its energy at a voltage which is clamped at the output voltage.

This system gives a linear representation of output voltage, with temperature variations and voltage drops across the various diodes having negligible effect on the accuracy of the error correction. Furthermore, it is not necessary to load energy into the sense transformer from the output side of the power supply, as energy may be loaded into the sense transformer from any source including an external source.

Figure 3:
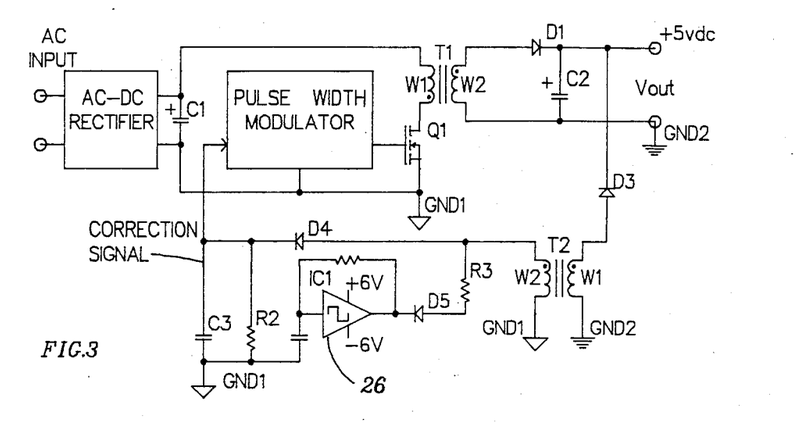
FIGS. 3 through 8 are schematic diagrams of additional embodiments of power supplies which employ my inventive sense transformer.

FIGS. 3 through 8 illustrate various embodiments of this inventive voltage regulator. Elements in a circuit which have identical designations (e.g., D2, R1) as elements in the other circuits indicate that those elements perform identical functions. In FIG. 3, sense transformer T2 is charged at a rate independent of the duty cycle of $V_{in}$. Sense transformer T2 is charged by oscillator 26 in series with diode D5 and resistor R3. Oscillator 26 generates an AC output voltage which is rectified by diode D5 so only the negative portion of the AC voltage is applied across winding W2 of sense transformer T2. During this negative portion, sense transformer T2 saturates. Diodes D4 and D3, performing a similar function as in FIG. 2a, are reversed biased so that sense transformer T2 retains its stored energy. As oscillator 26 generates a positive voltage in the AC cycle, diode D5 becomes reversed biased, and the voltages on windings W1 and W2 of sense transformer T2 reverse polarity due to the collapsing magnetic field in the core of sense transformer T2. As in the circuit of FIG. 2a, the voltage across winding W1 becomes clamped to $V_{out}+0.7$ volts and causes a voltage corresponding to $V_{out}+0.7$ volts to appear across winding W2 of sense transformer T2. This voltage then forward biases diode D4 and charges capacitor C3 to a voltage corresponding to $V_{out}$.

Figure 4:
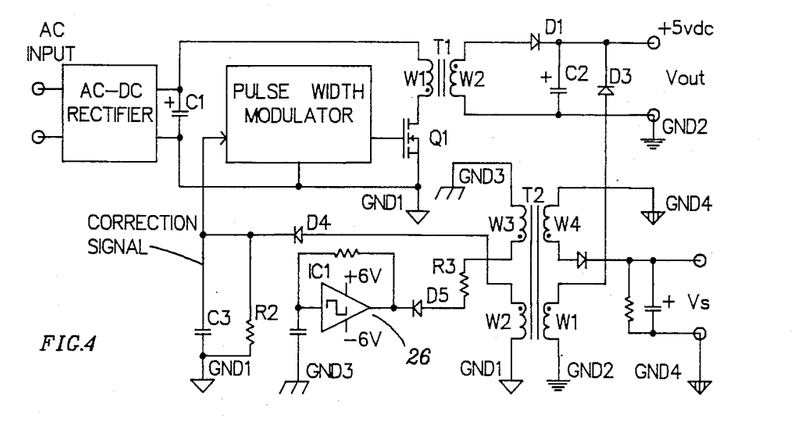

In FIG. 4, oscillator 26, using a third ground, is isolated from the power supply and charges sense transformer T2 through a third winding W3. An additional sense voltage $V_s$, corresponding to $V_{out}$, is provided by a fourth winding W4 in sense transformer T2 and is isolated from the power supply using a fourth ground GND4. $V_s$ is then applied to other circuits which are electrically isolated from grounds 1, 2, and 3.

Figure 5:
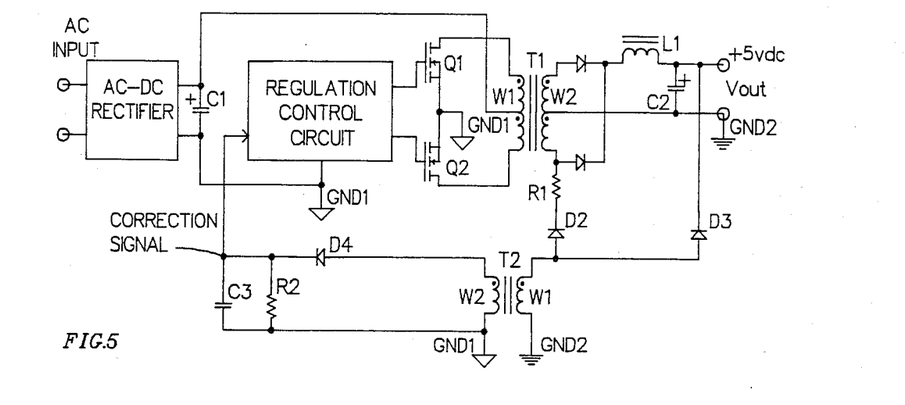

FIG. 5 shows a push-pull converter, wherein transistors Q1 and Q2 switch alternately so as to double the frequency of the quasi-squarewave voltage across primary winding W1 of power transformer T1. This increases output power and eases filtering of the rippled signal. Inductor L1 and capacitor C2 provide filtering. Sense transformer T2 is charged when transistor Q2 is on, and winding W1 of sense transformer T2 rises to approximately $V_{out}+0.7$ volts when Q2 is off.

Figure 6:
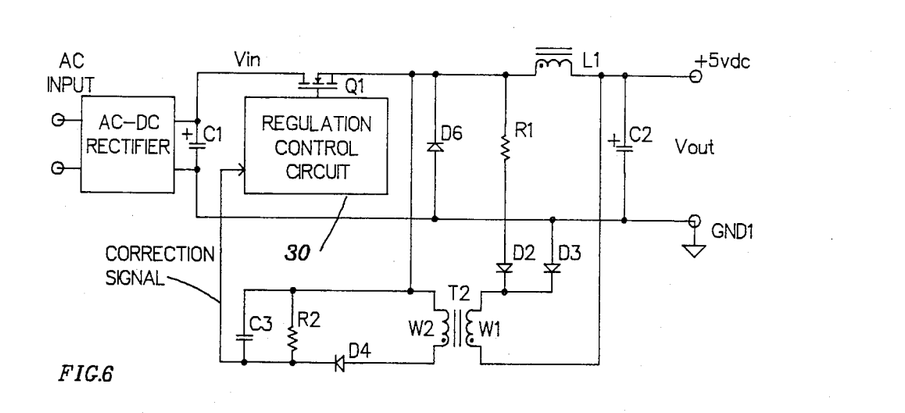

FIG. 6 shows a power supply which does not use a power transformer. In this circuit, when switching transistor Q1 is on, input voltage $V_{in}$ charges inductor L1 while capacitor C2 provides the desired voltage and current to the output load. During this time, diode D2 is forward biased and current flows through winding W1 of sense transformer T2, charging sense transformer T2 to saturation. When switching transistor Q1 is switched off, the voltage across inductor L1 reverses polarity and forward biases diode D6, shorting the dot-indicated end of inductor L1 to GND1. Inductor L1 is now effectively across the output terminals of the power supply and supplies power to the output load as well as recharges filter capacitor C3. During this time the voltage across winding W1 of sense transformer T2 reverses polarity, due to diode D2 becoming reverse biased and the charging energy into sense transformer ceasing, and rises until it forward biases diode D3, clamping the voltage across winding W1 to $V_{out}+0.7$ volts. A corresponding voltage is generated across secondary winding W2 of sense transformer T2 which forward biases diode D4 in series with winding W2. Current then flows through resistor R2 with the top end of resistor R2 held to 0.7 volts below ground GND1 due to the voltage drop across diode D6. Hence, capacitor C3 charges to a voltage corresponding to the voltage across winding W1 of sense transformer T2, which is $V_{out}+0.7$ volts. This voltage is applied to regulation control circuit 30, which, if regulator control circuit 30 is a pulsewidth modulator, compares the voltage to a reference voltage and adjusts the duty cycle of $V_{in}$ accordingly. This circuit is useful in that it is inexpensive and provides isolation between $V_{out}$ and modulator 30 using only one ground.

Figure 7:
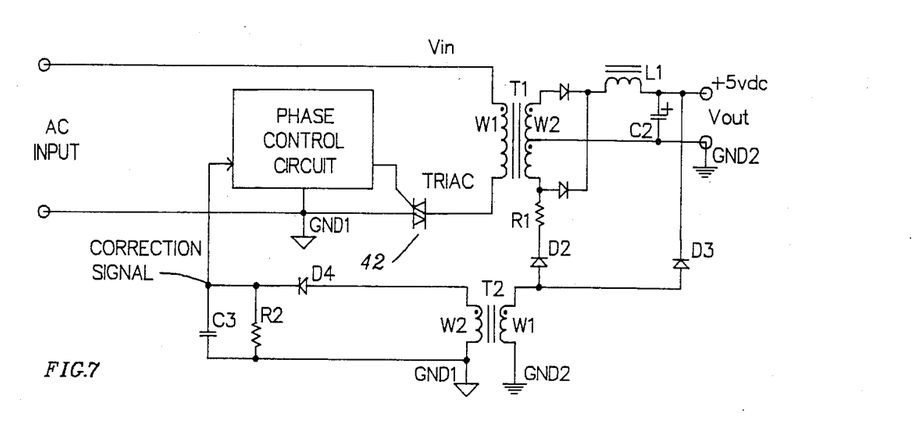

FIG. 7 shows an AC to DC power supply circuit wherein a rapidly switched AC input voltage $V_{in}$ simultaneously generates a positive voltage with respect to ground GND2 and a negative voltage with respect to ground GND2 across winding W2 of power transformer T1. Sense transformer T2 is charged when $V_{in}$ is at a negative voltage in its AC cycle and clamps to DC voltage $V_{out}+0.7$ volts when $V_{in}$ is at a positive voltage. An increased $V_{out}$ produces an increased DC voltage into phase control circuit 40, which decreases the duty cycle of $V_{in}$, via triac 42, accordingly.

Figure 8:
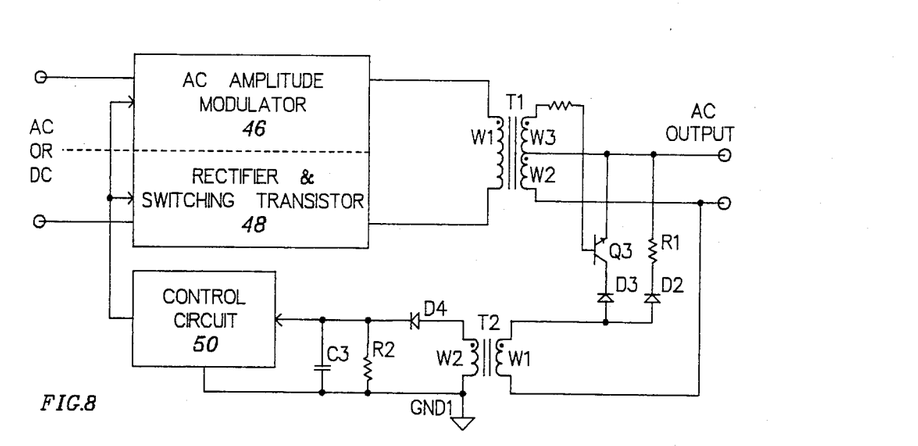

FIG. 8 may be configured either as an AC to AC or a DC to AC converter and includes either AC amplitude modulator 46, which may be a triac as in FIG. 7 or a linear device, or a rectifier/switching transistor combination 48 as in FIGS. 2-6, depending on the desired input voltage (i.e., AC or DC) into power transformer T1. Although this circuit may be operated with a pure AC sine wave input, or a chopped AC input, into power transformer T1, it will be assumed for description purposes that a quasi-squarewave voltage is applied across winding W1 of power transformer T1. Since the output load is connected directly across secondary winding W2 of power transformer T1, $V_{out}$ will correspond to the shape of the input voltage waveform across primary winding W1 of power transformer T1. When the switched voltage across winding W1 of power transformer T1 produces a voltage across winding W3 of power transformer T1 which is negative at the dot-indicated end with respect to its other end, NPN transistor Q3 is switched off. Since the voltage at the dot-indicated end of winding W2 of power transformer T1 is also negative with respect to its other end, diode D2, whose anode is connected to the dot-indicated end of winding W1 of sense transformer T2 and whose cathode is connected to the dot-indicated end of winding W2 of power transformer T1, is forward biased, and sense transformer T2 becomes charged to saturation. When the voltage at the dot-indicated end of winding W3 becomes positive with respect to its other end (i.e., when the voltage across winding W1 of power transformer T1 has been switched on or off depending on the polarity of the DC input voltage) transistor Q3 turns on. Energy stored in sense transformer T2 causes the voltage across winding W1 of sense transformer T2 to rise until diode D3 is forward biased, thus, clamping the voltage across winding W1 of sense transformer T2 to $V_{out}+0.7$ volts, $V_{out}$ being a quasi-squarewave output in this case. Diode D2 does not turn on due to the voltage drop across resistor R1. Thus, the voltage across winding W2 of sense transformer T2 reflects the clamped voltage, $V_{out}+0.7$ volts, across winding W1 of sense transformer T2. This voltage across winding W2, after rectification by diode D4 and peak detection by resistor R2 and capacitor C3 in parallel, is applied to control circuit 50 which adjusts the input voltage duty cycle accordingly. This circuit enables the output and the input sections of the power supply to be electrically isolated with only one ground.

The above described embodiments disclose a number of highly accurate linear voltage regulation circuits which are temperature insensitive and are less costly to build than voltage regulation circuits employing opto-isolation. There are minor errors incurred in each voltage regulator embodiment, which are easily engineered out of the system. Included are copper losses of the sense transformer T2, magnetic core losses of sense transformer T2, and voltage drops across the various low current diodes. All of these errors can be factored out to the degree of accuracy desired.

The common inventive concept behind the regulated power supply circuits of FIGS. 2 through 8 is that each regulated power supply is able to use a sense transformer to transmit an accurate reflection of an AC or DC output voltage to an error correction means. Various techniques are disclosed herein for charging and discharging the sense transformer so as to provide a voltage across the secondary winding of the sense transformer corresponding to the output voltages of the power suply. Also, various techniques have been disclosed herein to provide electrical isolation between the input and output sections of the power supply utilizing 1, 2, 3, or 4 ground points as desired. Other techniques for charging and discharging the sense transformer and providing electrical isolation will become apparent to those skilled in the art. Accordingly, where the invention has been particularly shown and described with reference to the preferred and alternative embodiments thereof, it will be understood by those skilled in the art that deviations may be made therein without departing from the spirit and scope of the invention.

I claim:

1. A voltage regulator comprising:
   a sense transformer;
   charging means electrically coupled to said sense transformer for charging said sense transformer to saturation during a charging cycle;
   clamping means electrically coupled to a first winding of said sense transformer for clamping a voltage across said first winding, during a clamping phase, to a voltage corresponding to an output voltage of a power supply;
   detecting means coupled to a second winding of said sense transformer for detecting a voltage across said second winding when said voltage across said first winding is clamped, said voltage across said second winding corresponding to said voltage across said first winding, and providing a control voltage; and
   controlling means for receiving said control voltage and adjusting an input voltage into said power supply.

2. The voltage regulator of claim 1 wherein said charging means comprises a diode and resistor in series coupled between a first terminal of an AC voltage source and a first termination point of said first winding of said sense transformer, and wherein a second terminal of said AC voltage source and a second termination point of said first winding are short circuited together.

3. The voltage regulator of claim 2 wherein said AC voltage source is a voltage across a secondary winding of a power supply transformer.

4. The voltage regulator of claim 1 wherein said clamping means comprises a diode coupled between a first output terminal of said power supply and a first termination point of said first winding of said sense transformer, and wherein a second output terminal of said power supply and a second termination point of said first winding are shorted together, so that said clamped voltage across said first winding is equal to said output voltage plus a voltage drop across said diode.

5. The voltage regulator of claim 1 wherein said charging means comprises a diode and resistor in series coupled between a first terminal of an AC voltage source and a first termination point of said second winding of said sense transformer, and wherein a second terminal of said AC voltage source and a second termination point of said second winding are short circuited together.

6. The voltage regulator of claim 5 wherein said AC voltage source is an external AC voltage generator.

7. The voltage regulator of claim 1 wherein said detecting means comprises a diode, a capacitor and a resistor, wherein a first terminal of said diode is coupled to a first termination point of said second winding of said sense transformer, and wherein a second terminal of said diode is coupled to said capacitor and resistor, said capacitor and resistor being in parallel, said capacitor and resistor providing peak detecting and averaging of said voltage across said second winding, said second terminal of said diode also being coupled to said controlling means.

8. The voltage regulator of claim 7 wherein said controlling means comprises a pulsewidth modulator for controlling duty cycle of said input voltage.

9. The voltage regulator of claim 7 wherein said controlling means comprises a controllable resistance element in series with said input voltage.

* * * * *